Figure 1:
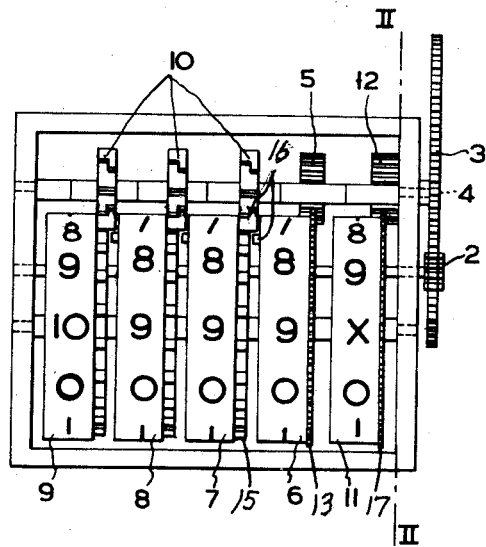

Oct. 20, 1953      C. A. S. HAMELINK      2,656,108
REGISTER HAVING A CHECK WHEEL CONNECTED
FOR OPERATION THEREBY
Filed May 4, 1951

Inventor
Cornelis A. S. Hamelink
By Robert E. Burns
Attorney

Patented Oct. 20, 1953

2,656,108

UNITED STATES PATENT OFFICE 2,656,108

REGISTER HAVING A CHECK WHEEL CONNECTED FOR OPERATION THEREBY

Cornelis A. S. Hamelink, Amsterdam, Netherlands, assignor to Theodorus Reumerman, Zandvoort, and Willem Hendrik Theodorus Helmig, Leiden, Netherlands Application May 4, 1951, Serial No. 224,585
In the Netherlands January 5, 1951

2 Claims. (Cl. 235—117)

The present invention relates to an improvement in counters or registers for measuring instruments and numerators as disclosed in copending application Serial No. 46,494, filed on August 27, 1948, by Theodorus Reumerman and Willem Hendrik Theodorus Helmig, to whom the present application has been assigned.

The registers disclosed in said copending application comprise, in addition to the usual figure wheels for the units, tens, hundreds, etc., an N-partite check wheel or code wheel bearing N different check symbols, N being a prime number greater than 10, such as 11 or 13. The figure wheels are driven in the usual manner, i. e. means are provided for displacing the unit figure wheel either step by step or continuously, and each of the remaining figure wheels is displaced over one position after each complete revolution of the preceding figure wheel. Thus, the figure wheels produce a series of consecutive numbers. In a measuring instrument, such as a gas, water or electricity meter, these numbers indicate the quantity measured; in a numerator, they are the serial numbers to be printed on a series of documents. Upon each displacement of the unit figure wheel over one tenth of its circumference, the check wheel is automatically displaced over one Nth of its circumference. Thus, the check wheel displays an appropriate check symbol for each number displayed by the figure wheels.

For instance, in a register according to said copending application comprising four figure wheels and an 11-partite check wheel bearing the digits from 0 to 9 in their natural order, followed by an X, the following symbol groups will be displayed if all wheels, including the check wheel, occupy their zero position at the beginning of the registering:

| | | |
|---|---|---|
| 0000–0 | 0010–X | 0020–9 |
| 0001–1 | 0011–0 | 0021–X |
| 0002–2 | 0012–1 | 0022–0 |
| 0003–3 | 0013–2 | 0023–1 |
| 0004–4 | 0014–3 | 0024–2 |
| 0005–5 | 0015–4 | 0025–3 |
| 0006–6 | 0016–5 | 0026–4 |
| 0007–7 | 0017–6 | 0027–5 |
| 0008–8 | 0018–7 | 0028–6 |
| 0009–9 | 0019–8 | 0029–7 | and so on.

Thus, the displayed check symbol gives an indication of the remainder obtained on dividing the displayed number by 11. Hence, it is possible at any time to check the operation of the register and the correctness of a number taken from the register, together with the appertaining check symbol, by determining the remainder obtained on division by 11 of the reading, or of the number taken from the register, respectively, and by comparing this remainder with the check symbol displayed by or taken from the check wheel of the register.

After having reached their maximum position, wherein all figure wheels display a 9, the registers of measuring instruments, such as gas, water, and electricity meters, return to their zero position, wherein all figure wheels display a 0. Registers of numerators are often set back by hand to their zero position after a certain order has been printed, but it may be desirable under certain circumstances to operate the register continuously, so that the zero position automatically appears after the maximum position has been reached.

In registers of the above-mentioned kind, the passage of the register through its maximum position gives rise to a difficulty which may be most easily explained with reference to a numerical example. Suppose that the register comprises four figure wheels, and that the number N is equal to 11. Thus, the highest number to be displayed by the register is the number 9999, which is divisible by 11, so that the check symbol indicating the remainder 0 pertains to this number. In the following step of the register, all figure wheels return to the zero position, so that the number 0000 is displayed. In the meantime, the check wheel has also been displaced over one step, so that it indicates the check symbol pertaining to the remainder 1. Hence, the number 0000 which was accompanied by the check symbol 0 in the first registering, will now have the check symbol 1. On the next passage of the maximum position of the counter, the number 0000 will obtain the check symbol 2, and so on.

Thus, it will only be possible to check the operation of the register, or the correctness of a number taken from the register together with its check symbol, if it is known how many times the register has passed its maximum position after the beginning of the first registering. Hence, each passage of the counter through its maximum position must be recorded. In general, this procedure does not involve many difficulties in the case of gas, water and electricity meters. When the reading is smaller than the previous one, so that the meter has apparently passed its zero position, it is already usual with these meters that the reader or the administration puts a one before the reading, so that the previous reading may be subtracted therefrom. Now, the staff may be instructed to retain this 1 before the reading until the meter again passes its zero position, after which the 1 is changed to a 2, and so on. As soon as the meter has passed its zero position N times, the correction figure is again left out, and the above-mentioned procedure is repeated. For the readings corrected in this manner, the appertaining check symbol again gives a univocal indication of the remainder obtained on dividing the reading by N. Moreover, the shift of the check symbol provides a warning in case the consumption by a consumer in a certain period has been larger than the capacity of the meter.

However, it may be a disadvantage under certain circumstances that the number of figures to be digested in the administration in applying the above-described method is much greater than up to now. Furthermore, it may be a disadvantage in some cases that the operation of the register cannot be checked without referring to the reading book, in which the reader has recorded how many times the meter has passed its zero position.

In considering documents numbered by means of the numerator disclosed in the parent application, it is naturally impossible to know how many times the numerator has passed its zero position if the same has been continuously operated. Thus, if a continuous operation of the register of a numerator according to the parent application is desired, the shift of the check symbol on passing the zero position must be avoided in any case.

The invention has for its object to provide means for preventing an alteration of the check symbol pertaining to a certain number upon passing the zero position of the register.

According to the invention, the first figure wheel from the left is an N-partite wheel, adapted to be displaced over one Nth of its circumference after each complete revolution of the second figure wheel from the left.

For instance, if the register comprises four figure wheels, and if the number N is equal to 11, the register does not count up to 9999 any more, but instead thereof it counts up to the number 10,999, yielding a remainder 10 upon division by 11. After that the number 0000 again appears, but this number is now accompanied by the check symbol indicating the remainder 0. Similarly, a register having four figure wheels, wherein the number N is equal to 13, will count up to the number 12,999, yielding a remainder 12 upon division by 13, after which the number 0000 will appear together with the check symbol pertaining to the remainder 0.

Figure 2:
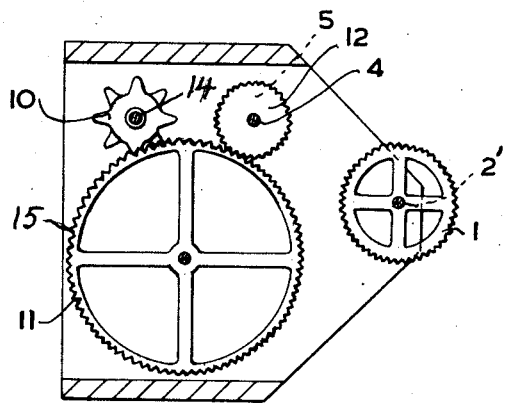

The invention will be more fully explained with reference to the accompanying drawing, wherein Figs. 1 and 2 comprise a front view, and a side view, respectively, of an embodiment of the invention.

The register shown in the drawing may be used, for instance, in electricity meters. It has a plurality of figure wheels 6, 7, 8 and 9, each for one of the decimal positions of the numbers to be displayed by the register, four such wheels being shown. The register is driven by means of a toothed wheel 1, mounted on a shaft 2' which also carries a pinion 2. This pinion engages a toothed wheel 3, mounted on a shaft 4. The shaft 4 carries a pinion 5 engaging a toothed wheel 13 integral with the first figure wheel from the right i. e. the wheel 6 for the lowest decimal position. The remaining figure wheels 7, 8 and 9 are driven by toothed wheels 10 freely rotatable around a fixed shaft 14, and provided with teeth alternately extending over the entire width and over half the width of the toothed wheel. Each of these toothed wheels engages a continuous row of pins 15 on a figure wheel lying at the left, and two pins 15 on a figure wheel lying at the right, so that each figure wheel is displaced over one step after each complete revolution of the preceding figure wheel. An N-partite check wheel 11 is driven by a pinion 12 fixed on shaft 4 and engaging a toothed wheel 17 integral with the check wheel 11. The gear ratios of the gear 13 and pinion 5 and of the gear 17 and pinion 12 are such that each time the unit wheel 6 moves one tenth of a revolution, the check wheel 11 moves one Nth of a revolution, N being 11 in the example shown in the drawings. Thus, for example, if the gear ratio of pinion 5 to gear 13 is 2:10, the ratio of pinion 12 to gear 17 will be 2:11. As there are eleven characters on wheel 11 and ten on wheel 6, a new character will appear on wheel 11 each time wheel 10 is advanced from one number to the next. Thus, the check symbol pertaining to the reading is always displayed by the check wheel.

According to the present invention, the first figure wheel from the left i. e. the wheel 9 for the highest decimal position does not bear the figures from 0 to 9 as usual, but instead thereof the figures from 0 to N-1, which in the illustrated embodiment is 0 to 10, so that the register registers up to 10,999 before returning to the zero position. The pins arranged on the figure wheel 9 are spaced at a smaller distance with respect to each other than the pins on the remaining figure wheels, so that the figure wheel 9 is displaced over one Nth, e. g. of its circumference after each complete revolution of figure wheel 8.

The operation of the register in accordance with the invention will be readily understood from the foregoing description. The unit wheel 6, driven through wheel 1, shaft 2', pinion 2, gear wheel 3, shaft 4, pinion 5 and gear 13, is advanced either continuously or stepwise—depending on the drive imparted to wheel 1—from 0 through 9 and then repeats. Check wheel 11 driven from shaft 4 through pinion 12 and gear 17 is advanced one character each time the unit wheel 6 is advanced one digit. However, since there are eleven characters on wheel 11, e. g. 0, 1, 2, 3, 4, 5, 6, 7, 8, 9 and X, wheel 11 is advanced only one-eleventh of a revolution each time wheel 6 is advanced one-tenth of a revolution. Hence, when wheel 6 has made a complete revolution to 0, wheel 11 will have made only ten-elevenths of a revolution and will be on X. As the wheel 6 starts its second revolution, the tens wheel 7 is moved from 0 to 1 by the toothed wheel 10 and pins 15 and 16. The wheel 11 continues to advance one step each time the wheel 6 advances but, on each revolution of wheel 6, wheel 11 drops one digit behind it. The result is that the check number on wheel 11 is always the remainder obtained by dividing the reading of the register by eleven. Thus, when the register reads 29, the check wheel will read 7 (i. e. 29−22=7). Each time wheel 6 or wheel 7 completes a revolution, the wheel to the right, i. e. 7 or 8, respectively, is moved ahead one tenth of a revolution in usual manner. However, each time wheel 8 completes a revolution, wheel 9 is moved ahead only one-Nth of a revolution, in this case one eleventh. When wheels 6, 7, 8 and 9 register 9999, check wheel 11 will show 0. Hence, if on the next move wheels 6, 7, 8 and 9 all went to 0—as in the usual register—the check wheel 11 would be out of time since it would register not 0 but 1. Since, however, wheel 9 has eleven digits, the next move of the register will be to 10,000 and the check wheel will correctly show 1 (i. e. 10,000−9,999=1). When the register reaches 10,999, the check wheel will be at X (10,999−10,989+10)

On the next move, all of the wheels, including check wheel 11, go to 0. The register is thereby ready to start a new cycle which will be the same as the previous one. Hence, it is not necessary to keep a record of the number of cycles completed to justify the check wheel.

Although the invention has been described hereinbefore with reference to a measuring instrument, it will be understood that it may be applied to numerators in exactly the same manner.

If the number N is equal to 13, the distance between the pins on the first figure wheel from the left of the above-described register for measuring instruments must be chosen in such manner that the figure wheel in question is always displaced over one 13th of its circumference.

I claim:

1. A register for measuring instruments and counting devices, comprising a plurality of figure wheels each for one of the decimal positions of the numbers to be displayed by the register, driving means for moving the figure wheel for the lowest decimal position, means for moving each of the remaining figure wheels one step after each complete revolution of the figure wheel for the next lower decimal position, so that the register displays a series of consecutive numbers, a checking wheel displaying an appropriate check symbol for each number displayed by the register, and means for moving said checking wheel in unison with the figure wheel for the lowest decimal position in such manner that one step of said checking wheel corresponds with one step of said last-mentioned figure wheel, a step being equal to one Nth of the circumference for the checking wheel and for the figure wheel for the highest decimal position, and to one tenth of the circumference for all other figure wheels, N being a prime number greater than 10.

2. A register for measuring instruments and counting devices, comprising a plurality of figure wheels each for one of the decimal positions of the numbers to be displayed by the register, the figure wheel for the highest decimal position bearing numbers from 0 to N−1, and each of the other figure wheels bearing numbers from 0 to 9, driving means for moving the figure wheel for the lowest decimal position, means for moving each of the remaining figure wheels one step upon each complete revolution of the figure wheel for the next lower decimal position, so that the register displays a series of consecutive numbers as the figure wheel for the lowest decimal position is driven, a checking wheel bearing N different symbols, and means for moving said checking wheel in unison with the figure wheel for the lowest decimal position so that the checking wheel is moved one step for each step of the last mentioned figure wheel, a step being equal to one Nth of a revolution for said checking wheel and for the figure wheel for the highest decimal position and to one tenth of a revolution for all the other figure wheels, N being a prime number greater than 10.

CORNELIS A. S. HAMELINK.

References Cited in the file of this patent

UNITED STATES PATENTS

| Number | Name | Date |
|---|---|---|
| 235,407 | Benton | Dec. 14, 1880 |
| 888,781 | Bowlus | May 26, 1908 |
| 1,086,410 | Smith | Feb. 10, 1914 |